United States Patent [19]
Coughran, Jr.

[11] 4,313,479
[45] Feb. 2, 1982

[54] DRAW SHEAR

[75] Inventor: Samuel J. Coughran, Jr., Cedartown, Ga.

[73] Assignee: Rome Industries, Inc., Cedartown, Ga.

[21] Appl. No.: 700,881

[22] Filed: Jun. 29, 1976

[51] Int. Cl.³ .............................................. A01G 23/08
[52] U.S. Cl. .................................... 144/3 D; 91/448;
91/532; 144/34 E
[58] Field of Search ................... 146/2 Z, 3 D, 34 R,
146/34 E, 309 P, 309 C; 294/106; 83/928;
91/412, 413, 414, 448, 411 B, 532, 526

[56] References Cited
U.S. PATENT DOCUMENTS

| | | | |
|---|---|---|---|
| 3,350,986 | 11/1967 | Berta et al. | 91/414 |
| 3,468,352 | 9/1969 | Larson et al. | 144/34 E |
| 3,493,020 | 2/1970 | Chopt | 144/34 E |
| 3,536,113 | 10/1970 | Sutherland | 144/34 E X |
| 3,565,141 | 2/1971 | Galis | 144/34 E |
| 3,785,415 | 1/1974 | Taponen | 144/34 R |
| 3,795,264 | 3/1974 | Coughran, Jr. | 144/3 D |
| 3,910,326 | 10/1975 | Tucek | 144/3 D X |
| 3,994,325 | 11/1976 | Cryder et al. | |
| 4,050,488 | 9/1977 | Albright | 144/34 E |

Primary Examiner—W. D. Bray
Attorney, Agent, or Firm—Newton, Hopkins & Ormsby

[57] ABSTRACT

A tree harvesting machine is disclosed in which a grappling arm functions to reach behind a tree and draw the machine forwardly to force a shearing blade through the tree close to the ground. The harvester frame holds the severed tree and includes spring-loaded holders which allow the tree to enter the collecting space but prevent its escape once severed. The grappling or draw arm is operated by two piston/cylinder devices connected mechanically in parallel but which are hydraulically actuated in a particular sequence and fashion which assures quick closing of the draw arm upon a tree, slow but powerful shearing action, and quick opening of the draw arm.

28 Claims, 10 Drawing Figures

DRAW SHEAR

BACKGROUND OF THE INVENTION

This invention relates to tree harvesting devices of the type in which a support assembly is provided with a shearing blade and carries means for reaching behind a tree to grapple it and draw the shearing blade into the tree. This general arrangement is disclosed in U.S. Pat. No. 3,785,415.

BRIEF SUMMARY OF THE INVENTION

A primary concern of this invention is to provide a tree cutting attachment carried by and operated from a conventional vehicle in which the attachment is of simple, rugged and economic construction. To this end, the attachment features a single draw arm or grapple to draw the shearing blade against the tree. The draw arm is of massive, rugged construction and is driven by a pair of hydraulic piston/cylinder devices mechanically connected in parallel to the draw arm and operative to swing the draw arm between an inoperative position in which it is swung aside to accept a tree and a fully swung position in which it has scissored with respect to the shearing blade.

Another feature of the invention resides in the fact that the two piston/cylinder devices have dissimilar displacements over their working strokes and that control valve means operate to pressurize these devices in a particular sequence. The device which is of smaller displacement operates alone to swing the draw arm initially and this motion is characterized by rapid but low force-exerting capability. Subsequent to this initial movement the two devices are pressure operated in parallel so that the shearing force created by the two cylinder devices is characterized by slow but high force-exerting capability. Lastly, when the tree has been sheared the low displacement device remains in pressurized condition to grapple the draw arm while the pressure connection to the larger displacement device is reversed, with the net result that the draw arm is very rapidly returned to its inoperative position.

Another feature of the invention is that the stored kinetic energy of the propelling vehicle in conjunction with a non-movable blade is used to partially sever larger trees or to completely sever small trees. Subsequent to this shear the draw arm will be operating at rapid speed low force to catch the severed tree and inject it into the spring loaded holder means.

The piston/cylinder devices are actuated by the hydraulic pump means provided on the associated vehicle and a series of pressure-responsive devices are employed to sequence the pressure connections to the two devices. When the tree cutting attachment is actuated, the hydraulic system of the vehicle and in particular the normally provided pressure relief or overload valve device thereof is isolated from the hydraulic pump, thereby allowing the hydraulic system of the tree cutting attachment to operate at pressures higher than that allowed by such overload relief device. The control system embodies an electrohydraulic control arrangement and may include means for automatically de-clutching the powered vehicle or otherwise disabling its movement-transmitting capability during the shearing cycle.

Another principal feature of this invention involves an arrangement whereby a number of trees may be accumulated but wherein the draw arm is free to move from closed to open position without losing control of a sheared tree or of others already accumulated. For this purpose, the attachment features spring loaded holder means which swing aside to accept a tree but which automatically kick in behind a sheared tree to retain it in the accumulator section, leaving the draw arm free to swing open ready to accomodate another tree. The draw arm includes a spring-loaded kicker member which assures that a sheared tree is kicked beyond the holding means so that the latter may kick back to its holding position. The holding means also include hydraulic mechanism for swinging the holding means aside from blocking position whereby to allow accumulated trees to be discharged.

The harvesting device includes a frame of vertical channel or cradle-like form, preferably of open construction whereby the operator may observe operation, featuring a lower yoke or bifurcated frame portion which carries the shearing blade and draw arm, the blade being disposed to lie close to the ground surface. The frame also includes an upper yoke or bifurcated frame portion which mounts holder means, and additional holder means are also associated with the lower or shear frame portion. The shear frame portion presents a supporting floor formed at least partially by the shear blade itself so that the trees may be accumulated. The frame is attached to the hydraulic lift arm assembly of a conventional powered vehicle so that the cradle-like frame may be tipped back to transport accumulated tree and tipped forward to discharge them.

DETAILED DESCRIPTION OF THE INVENTION

Figure 1:
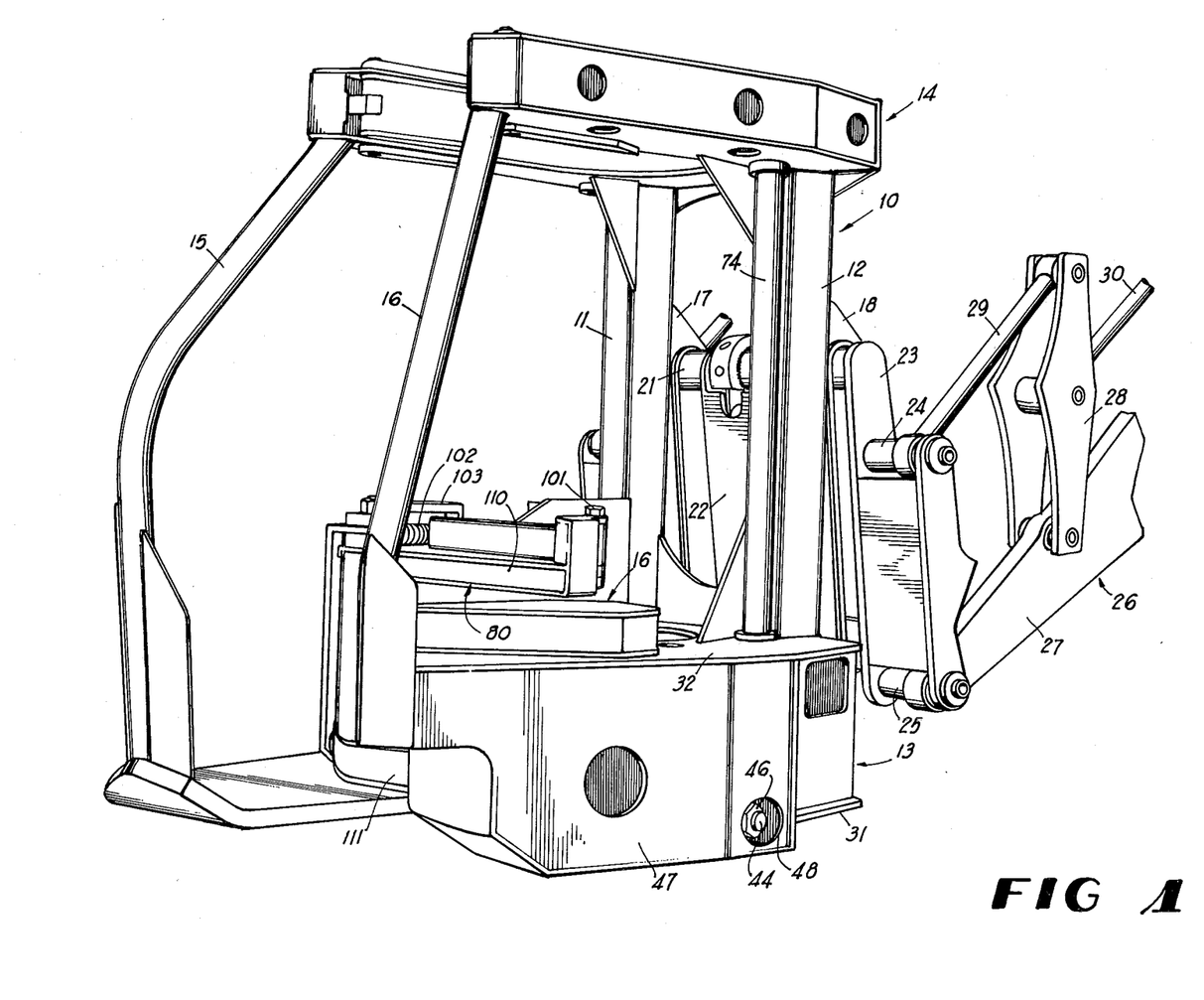
FIG. 1 is a perspective view illustrating a tree harvesting attachment of this invention attached to hydraulic lift means of a conventional powered vehicle.

In FIG. 1, a tree harvesting attachment embodying certain principles of this invention is indicated generally by the reference character 10 and will be seen to consist essentially of a generally open framework including the two uprights 11 and 12 joining the lower frame portion indicated generally by the reference character 13 and an upper frame portion indicated generally by the reference character 14. Each of these portions 13 and 14 is bifurcated as will be described more particularly hereinafter and the forward ends of the arms or bifurcations are joined by the frame posts 15 and 16 so that the frame 10 defines a vertically extending channel or generally cradle-like device which can accommodate trees therewithin, all as more particularly described hereinafter.

The rear sides of the uprights 11 and 12 are provided with upper bracket ears 17 and 18 and similar upwardly facing lower ears (FIGS. 4 and 5) are disposed therebelow to receive a conventional attaching frame assembly which includes an upper bar 21 received in the members 17 and 18 and connected to the lower frame piece through the upright portion 22. Each side of this attaching frame is defined by a vertical frame plate 23 one of which is shown in FIG. 1 and this frame plate carries the pivot pins 24 and 25 which attach to the lifting/tilting arm mechanism 26 associated with the dirigible powered vehicle to which the tree harvesting attachment is attached. One such mechanism 26 is provided for each side frame plate 23 and will be seen to include a forwardly projecting arm 27 carrying the upstanding pivoted crank mechanism 28 which is linked as at 29 to the upper pin 24, the arm 27 being linked to the lower pin 25 directly. A further link 30 connects to the lever or crank 28 and extends to the upper end of a further crank (not shown) pivoted centrally to the arm 27 and having a connection at its lower end pivotally to a piston/cylinder device hydraulically operated from the hydraulic system of the associated powered vehicle, all as is conventional in the art. In this fashion, the attachment 10 can both be lifted vertically and can be tilted backwardly and forwardly from the position shown in FIG. 1 for purposes which will be apparent hereinafter.

Figure 4:
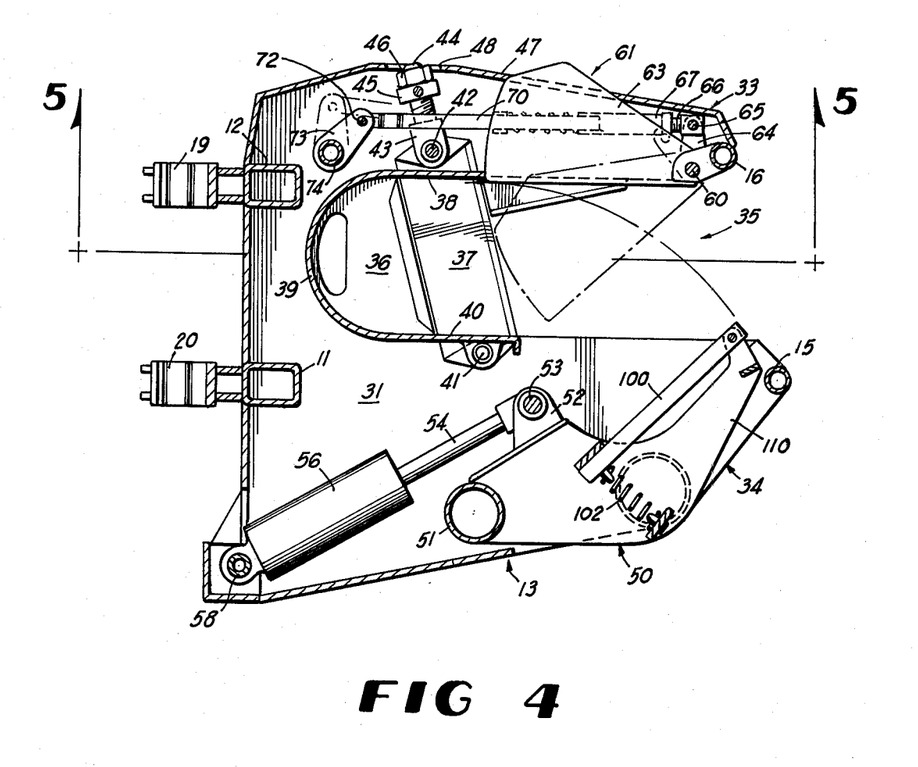
FIG. 4 is a horizontal section taken along the plane of section line 4—4 in FIG. 2.
Figure 5:
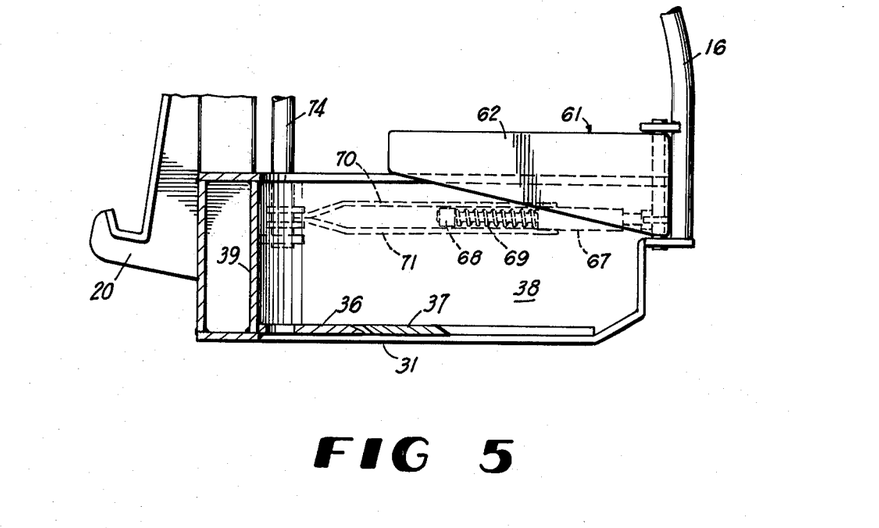
FIG. 5 is vertical section taken along the plane of section line 5—5 in FIG. 4.

The lower frame portion 13 is shown more particularly in FIG. 4 and will be seen to be of generally hollow configuration including a lower plate member 31 and an upper plate member 32, see particularly FIGS. 4 and 5 having vertically registered cut outs to define the arm portions or bifurcations 33 and 34 on either side of the throat defined by such cut outs. The remainder of this lower frame or shear blade frame 13 is formed by vertical plate members interconnecting and rigidifying the structure between the two main plate portions 31 and 32. The bifurcations 33 and 34 define a channel or throat indicated generally by the reference character 35 which at its inner end is provided with a floor plate portion 36 which is adapted to support the severed or sheared trees by their butt ends as described more particularly hereinafter and immediately ahead of this floor plate portion 36 there is provided a shear blade 37. The inner side of the throat 35 is largely blocked off by the vertical plate member which includes the strip 38 projecting along the left-hand side of the throat 35 to adjacent the tip of the bifurcations 33, the base of the throat being covered by the bight portion 39 and there lastly being another straight plate portion 40 extending partially along the right-hand side of the throat 35 as is shown most clearly in FIG. 4. The plate portion 38 has a suitable opening to receive one end of the shear blade 37 and likewise the portion 40 has an opening receiving same also, as will be evident from FIG. 4. The inner end of the shear blade 37 is pinned at 41 solidly to the frame structure and the outer end of the shear blade 37 is provided with a pin 42 which attaches a clevice 43 thereto, the threaded spindle 44 of the clevice projecting through swivel trunnion bracket 45 fixed to the framework and receiving, outboard thereof, an adjusting nut 46 by means of which the shear blade 37 may be placed under suitable tension. The outer plate member 47 is provided with an opening 48 allowing access to this adjusting nut 46, as will be clearly evident from FIG. 4.

Figure 2:
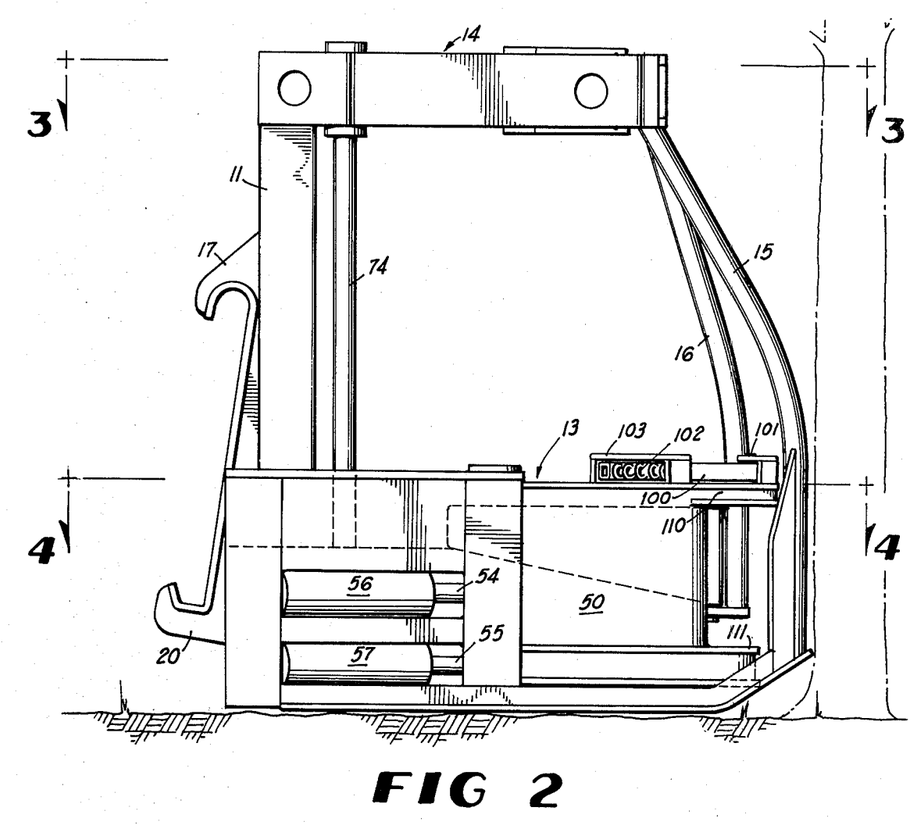
FIG. 2 is a side elevational view of the attachment illustrating its deposition as it is advanced to accept a standing tree.

The lower frame 13 also pivotally mounts the draw arm generally indicated by the reference character 50 which is pivoted at one end through the post member 51 between the upper and lower plates 32 and 31. The draw arm 50 is provided on its inner side, radially displaced from the post 51, with a series of ear means 52 which receive a pin 53 pivotally linking the draw arm to the free ends of the upper and lower piston rods 54 and 55, see FIG. 2. The respective cylinders associated with these pistons 54 and 55 are indicated by reference characters 56 and 57 and each of these cylinders is pinned as at 58 to the frame structure as is clearly shown in FIG. 4. Thus, the two piston/cylinder devices are mechanically linked in parallelism between the frame section 13 and the draw arm 15, the purpose of which will be presently apparent.

The lower frame section 13 also pivotally carries, about the pivot pin 60, the holder indicated generally by the reference character 61, see particularly FIGS. 4 and 5. The holder 61 is of L-shaped configuration in vertical section including the depending plate portion 62 and the top plate portion 63 which is adapted to be moved between the full and dashed line positions shown in FIG. 4, again the purpose of which will be presently apparent. For this purpose, the holder 61 is provided with a bracket ear portion 64 which is pinned at 65 to the forward end of a spring loaded link 66. The link 66 slidably projects through the bearing block 67 and carries a cross head member 68 at its inner end, see FIG. 5 in particular, between which cross head 68 and the inner end of the guide block 67 there is provided a compression spring 69. The guide block 67 if fixed to the forward ends of a pair of straps 70 and 71 which are pinned as at 72 to the lever member 73 fixed to a vertically extending shaft 74. As will be seen, rotation of the shaft 74 to dispose the lever 73 in the dashed line position shown in FIG. 4 will correspondingly shift the holder 61 to the dashed line position also shown in FIG. 4. However, the holder 61 can be thrown aside back from the dashed line position to the full line position in opposition to the compression spring 69, as will be evident. The purpose of this construction will be present hereinafter.

Figure 3:
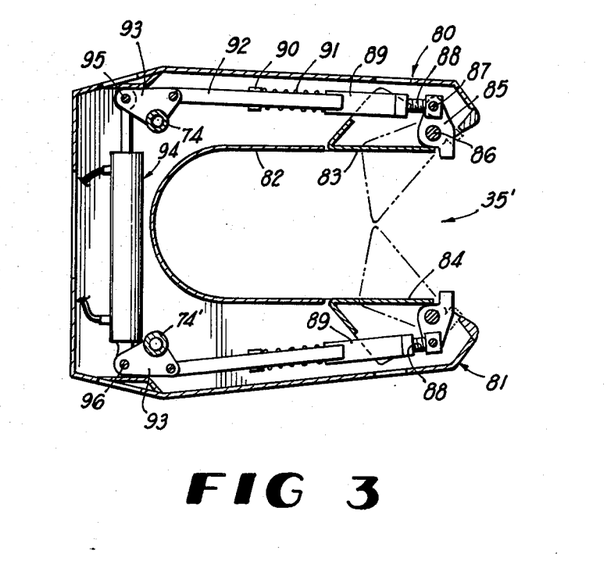
FIG. 3 is a horizontal section taken along the plane of section line 3—3 in FIG. 2.

With reference to FIG. 3, the construction of the upper frame section 14 will be seen therefrom. As is the case with the lower frame or shear frame section 13, the upper frame section 14 is built up of hollow configuration from suitable plate stock to define the bifurcations 80 and 81 and the closing plate 82 which closes the inner end or throat portion of the channel 35' defined between the bifurcations 80 and 81 terminates short of the forward ends of the bifurcations 80 and 81 to accommodate the two holder arms 83 and 84. These holder arms 83 and 84 normally are disposed in the full line position shown in FIG. 3 so as not to intrude in the channel or throat area 35' but are adapted to be disposed in the dashed line positions illustrated in FIG. 3 substantially completely blocking across the throat. Each arm 83 and 84 is provided with a lever ear 85 pivotally supported as by pin 86 and pinned as at 87 to the rod 88 and this rod 88 slidably projects through the guide block 89 in each case and is provided at its inner end with the cross head member 90 which captures the compression spring 91 between the cross head 90 and the guide block 89, similarly to the construction noted in conjunction with the holding means 61. The guide blocks 89 are connected by straps 92 to the link or lever 93 fixed to the previously mentioned vertical shaft 74 and a piston/cylinder device 94 is pivotally connected at its opposite ends at 95 and 96 to the two levers 93. It will be noted that the second shaft 74' does not extend vertically between the upper and lower frame portions 14,13. It will be appreciated that operation of the piston/cylinder device 94 may be used either to position the arms 83 and 84 and also the arm 61 either in the dashed or full line positions as previously described.

Figure 6:
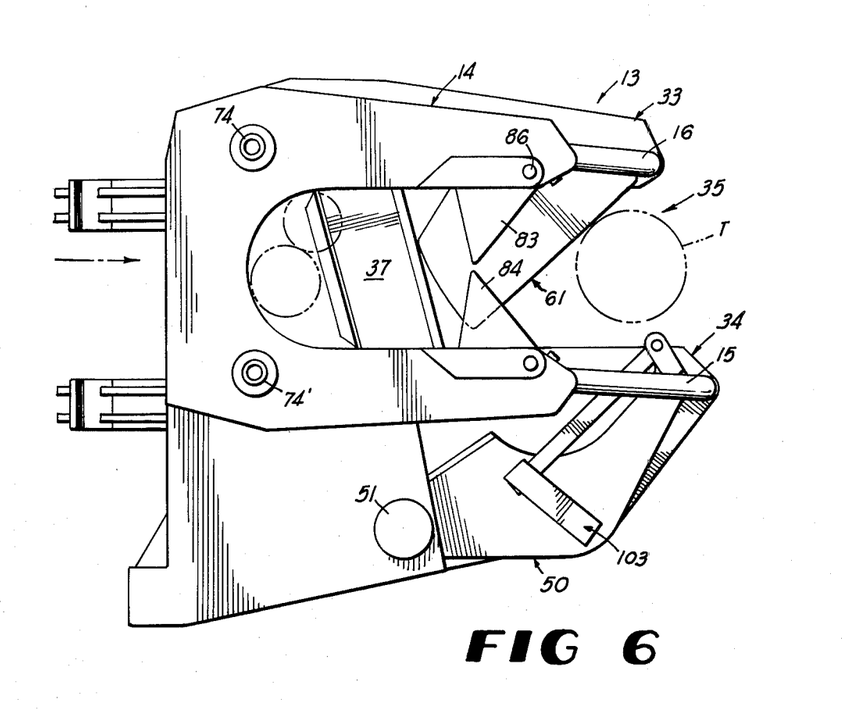
FIG. 6 is a plan view of the attachment illustrating the disposition of parts at the beginning of the shearing cycle.
Figure 7:
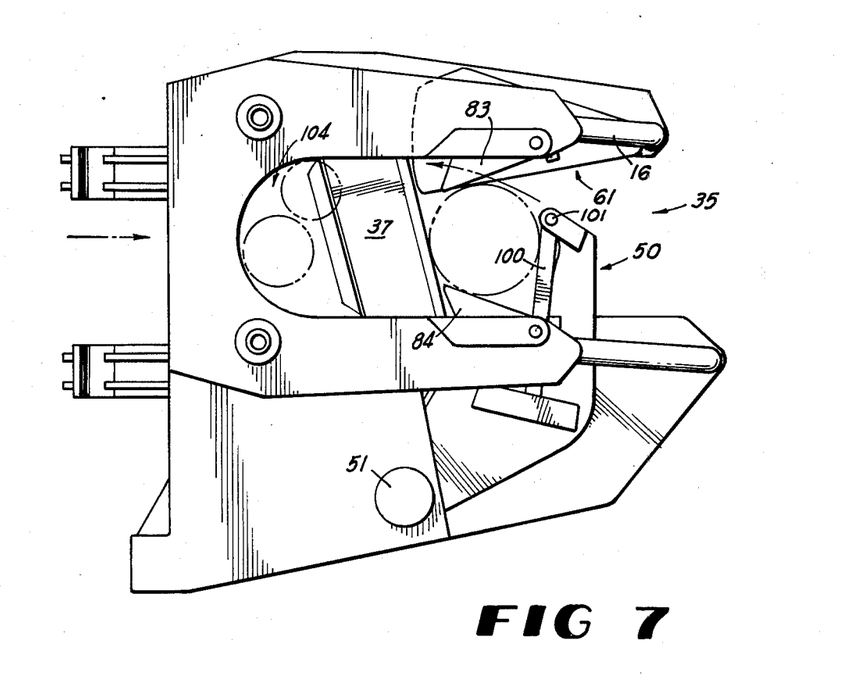
FIG. 7 is a plan view similar to FIG. 6 but showing the disposition of parts during the shearing cycle.

The operation of the device will be clear from a study of FIGS. 6 and 7. As noted, the normal disposition of the holding means 61, 83 and 84 is in the inwardly swung, throat-closing position and as the attachment is advanced partially to accept a standing tree T, the lower holding arm 61 is first engaged and will be bunted or swung aside until the tree T is disposed within the channel 35 sufficiently to allow the draw arm 50 to swing around behind and grapple the tree. This is illustrated in FIG. 7 and FIG. 7 also illustrates the operation of the kicker bar 100 pivotally attached as at 101 to the tip of the draw arm 50. The opposite end of the kicker bar 100 bears against a compression spring 102 housed within the housing 103, see particularly FIGS. 1 and 2 and as the draw arm 50 engages against the tree and draws the attachment forward to force the shear blade 37 against and then subsequently through the tree, the kicker bar is displaced against the compression spring 102 as is clearly evident in FIG. 7. The draw arm 50 scissors with respect to the shear blade 37 ultimately to reach a position in which the shear blade 37 has been forced all the way through the tree, at which point the compression spring 102 will kick the bar 100 and force the tree backwardly into the accumulation space 104 in the innermost portion of the throat 35 so that the tree trunk will be assured of being kicked past the inner ends of the holding arm 61, 83 and 84 so that they can then kick in or snap in behind the tree trunk and block the throat as is shown in FIG. 6 thereby to retain the severed tree within the accumulation space. In this way, a number of trees can be accommodated in the accumulation space 104 as is shown in FIGS. 6 and 7 by dashed lines and when the accumulation space is full, the vehicle can be operated to transport the trees to a discharge point where they are discharged or piled. In the transporting position of the cradle-like frame, the frame is preferably tilted backwardly through operation of the hydraulic system of the associated vehicle and then when discharged, the cradle will be tipped either vertically or slightly forwardly and then the piston/cylinder assembly 94 is operated to open the holder means and allow the trees to fall by gravity out of the cradle-like frame.

Figure 8:
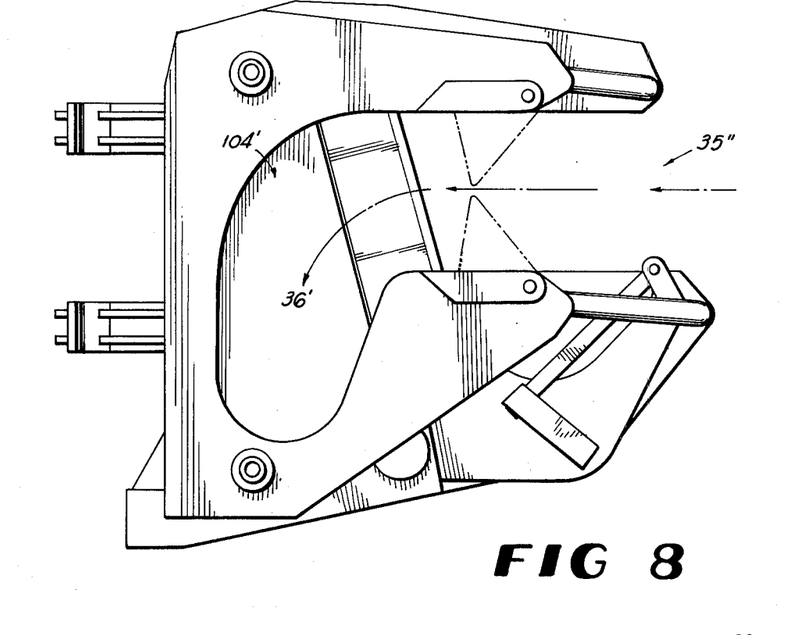
FIG. 8 is a plan view of a modified arrangement.

FIG. 8 shows a modified form of the invention wherein the throat 35" is much enlarged in its accumulation area 104' to allow a larger accumulation of severed trees, the floor plate 36' being thereby of appreciably greater area. Otherwise, the construction is described hereinbefore.

It should be noted that the construction of the draw arm 50 is such that it is bifurcated at its free end to present the upper and lower draw arm tips 110 and 111 to provide good stabilizing effect against the tree and also to assure that the tree is drawn in behind the holders in the top frame assembly portion 14.

Figure 9:
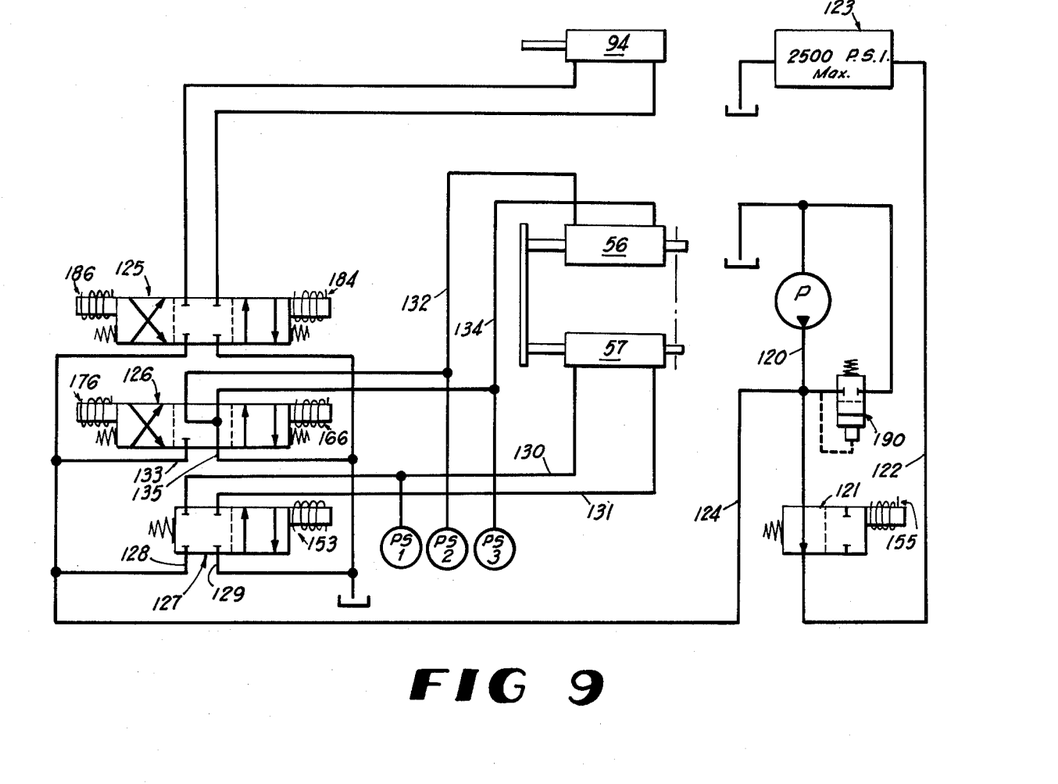
FIG. 9 is a schematic view showing the hydraulic system and control.
Figure 10:
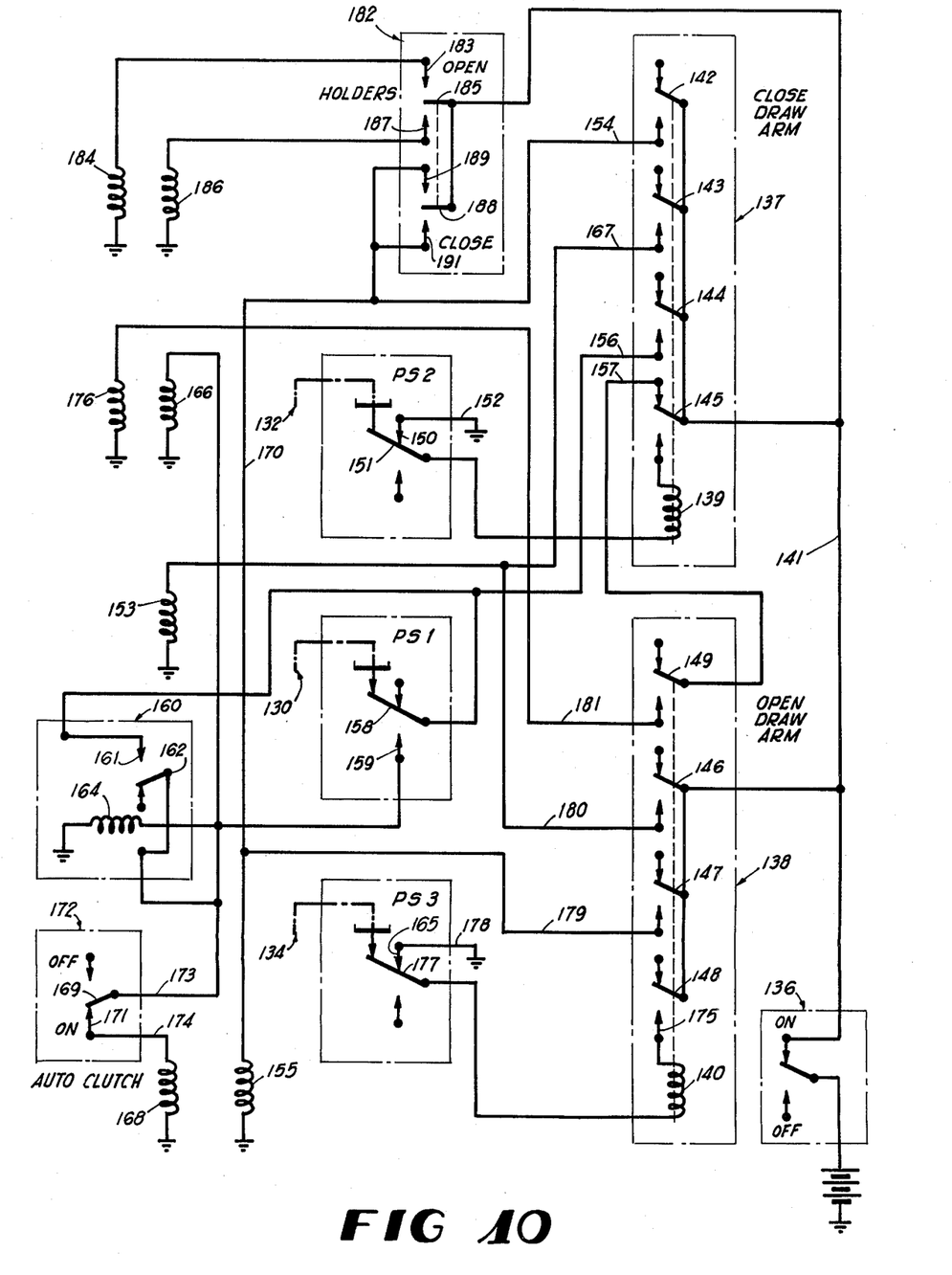
FIG. 10 is a circuit diagram of the electrical portion of the control system.

FIGS. 9 and 10 illustrate further important features of the present invention. FIG. 9 illustrates the hydraulic circuitry of the associated powered vehicle and of that of the tree harvesting attachment. The vehicle carries a hydraulic pump P having a predetermined maximum flow capacity which, for example, may be 35 gallons per minute. The discharge side line 120 of this pump leads through a valve mechanism 121 to the main line 122 which distributes hydraulic fluid to the hydraulic mechanism and valve control system indicated generally by reference character 123 which is normally associated with the vehicle as, for example, the raising and lowering mechanism for the lift arms and the like. Normally, this system 123 will include a pressure relief valve which is set at some maximum pressure beyond which the vehicle or hydraulic mechanism should not be operated, typically such maximum pressure being in the order of 2500 psi. The valve 121 is solenoid operated as will be described more particularly hereinafter but normally is in the position shown in FIG. 9, thereby allowing the pump P to feed the hydraulic system 123 of the vehicle. The main discharge line is also connected through the line 124 to the three valves 125, 126 and 127 which form part of the attachment control valve system. These three valves 125, 126 and 127 are also solenoid actuated as will be described hereinafter. The valve 127 includes the pressure inlet port 128 and the fluid discharge port 129 and this valve is normally spring urged to the closed position as is illustrated in FIG. 9 and is provided with a solenoid winding which effects movement of the valve spool to cause the line 130 to be connected to the pressure port 128 while the line 131 is connected to the return portion 129. These two lines 130 and 131 are connected at opposite ends to the piston/cylinder device 57 and when the pressure is connected to the line 130, the piston/cylinder device 57 will be pressurized to cause the draw arm 50 to move from its inoperative position toward the shear blade 37. Connected to the line 130 is a pressure switch PS1 which is set to close at some predetermined low pressure, for example 2500 psi to sense when the draw arm has pulled the attachment forward such that the shear blade 37 engages a tree trunk. As soon as the pressure switch PS1 is actuated, a solenoid associated with the valve 126 is energized to connected the line 132 to the pressure port 133 and the line 134 to the return portion 135 so that now the two piston/cylinder devices 56 and 57 are pressurized to operate mechanically in parallel. It is a feature of the invention that the piston/cylinder device 56 has a larger displacement volume over its stroke than does the piston/cylinder device 57. For example, the piston 56 may displace 28.28 cubic inches over its working stroke whereas the piston/cylinder device 57 displaces 19.78 cubic inches over its working stroke. Thus, when the piston/cylinder device 57 alone is connected to the pump P, the time required per inch of movement of piston stroke will be approximately 0.147 seconds and the draw arm will therefore quite rapidly grapple behind the tree and move the attachment forwardly until the shear blade 37 engages the tree trunk at which time the pressure will rise to 2500 psi and actuate the pressure switch PS1 to pressurize the piston/cylinder device 56 in parallel therewith whereby now reducing the rate of travel of the piston (it will now require approximately 0.358 second per inch of piston travel) to impart a low speed but high force drawing action to the draw arm. The operation with the piston/cylinder device 57 alone, of course, operates as a high speed, low force transmitting device.

The pressure switch PS2 is connected to the line 132 and is set to higher pressure than is the switch PS1, for example 3000 psi. The pressure in any event will not exceed that which is required to shear the tree but when the pistons reach the ends of their stroke, pressure will build up rapidly to exceed or reach 3000 psi and the switch PS2 will therefore operate and its function is to deenergize one solenoid coil associated with the valve 126 and energize the other solenoid coil associated with the valve 126, the latter effecting connection of the line 132 to the return port 135 and line 135 to the pressure point 133. Thus, the piston/cylinder device 56 will now be operated in a direction to open the draw arm. However, the piston/cylinder device 57 remains pressure connected to continue force and direction to close the blade. Thus, due to the greater displacement of piston/cylinder device 56 vs. piston/cylinder device 57 the return or opening movement of the draw arm 50 will take place, and is characterized by very low force but very high speed movement.

The valve 125 has two solenoid coils associated with it either to expand or retract the piston/cylinder device 94 independently of the operation of the devices 56 and 57 as will now be described in conjunction with FIG. 10.

FIG. 10 represents the electrical diagram associated with the hydraulic system of FIG. 9. The electrical system includes the main control switch 136 which may be moved either to the "on" or the "off" position. When this switch is on, a single cycle sequence of operations as described above in connection with the hydraulic circuit will be effected provided the two switches 137 and 138 also are manually closed. The two switches 137 and 138 are the type which remain normally in open position but can be manually closed and, when closed each switch has a holding coil 139 or 140 associated therewith which will maintain the switch in closed position. These holding coils 139 and 140, however, are not effective to pull the switches to closed position, but simply to maintain them in a closed position once attained until the holding coils are deenergized. The holding actions of the coils 139 and 140 can of course be manually overridden if desired.

When the switch 136 is closed, line 141 is powered and consequently the four contacts 142, 143, 144 and 145 of switch 137 are powered as are the contacts 146, 147 and 148 of switch 138. However contact 149 of switch 138 is powered only when switch 137 is returned to open position as shown in FIG. 10 and of course with the switch 136 in the "on" position. With the switch 136 "on" and the switch 137 manually moved to "closed" position four circuits controlled by contacts 142, 143, 144 and 145 are made. One circuit is made through a holding coil 139 through the contact 145 and pressure switch PS2 through the fixed contact 150 and movable contact 151 thereof, through the line 152 to ground. A second circuit is made to the open contact 161 of the relay switch 160 through line 156 and contact 144, and to the open movable open contact 158 of pressure switch PS1. A third circuit is made through the solenoid or winding 153 to ground through line 167 and contact 143. The solenoid coil or winding 153 is connected to or associated with the valve 127 so as to pressurize the piston cylinder device 57. At the same time, the movable contact 142 of the switch 137 provides a fourth circuit through line 154 to the solenoid coil or winding 155 which is associated with the valve 121 to move it to a position in which the pump P is isolated from the vehicle hydraulic system.

Thus, the cycle of operation is initiated and the draw arm begins to close at its high rate of speed. As the cycle continues the pressure builds up due to increased resistance to movement of the draw arm 50 as the attachment is pulled forward to engage its shear blade with the tree, the pressure switch PS1 is actuated to move its movable contact 158 into contact with its fixed contact 159, thus completing the circuit through the pull-in winding coil 164 of relay switch 160 to ground through line 156 and movable contact 144. When pull-in winding coil is energized, movable contact 162 engages the fixed contact 161 to complete a circuit from contact 144 through line 156, thence through line 170 to the solenoid coil or winding 166 to ground. While this same current will continue to pass through the pull-in winding coil 164 to ground to retain the movable contact 162 engaged to the fixed contact 161 even though the pressure into PS1 may dissipate allowing movable contact 158 to open from fixed contact 159. The solenoid coil or winding 166 which is associated with the valve 126 to pressurize the hydraulic line 132 while connecting the hydraulic return line 134 to return so that, at this time, the two devices 56 and 57 will be operating in parallel as described hereinbefore.

A further feature of the invention incorporates the manually actuated switch 172 which, is in the "on" position to complete a circuit from movable contact 162 through line 173 to movable contact 169 to fixed contact 171 and the line 174 to the solenoid winding or coil 168 which is adapted to actuate mechanism which declutches the powered vehicle and assures that during the time when the relay switch 160 is energized the vehicle cannot be driven. This will be during the time of the cycle wherein the actual shearing is taking place as will be evident hereinafter.

When the draw arm has reached the end of its stroke and the tree has been severed, the pressure will rapidly build up and the pressure switch PS2 will be operated thereby breaking the circuit through the holding coil 139 and allowing the switch 137 to return to its normal open position. At this time contacts 142, 143, 144 and 145 will open halting draw arm in closed position and reengaging declutched vehicle.

If however, it is desired to have the cycle continue on to the draw arm open position, the switch 138 could have been "closed" at the same time as switch 137 was closed without altering the aforesaid sequence when both switches 137 and 138 are "closed" line 141 powered contacts 148, 147 and 146 of the switch 138 make three circuits. One circuit is made through a holding coil 140 through the contact 148 line 175 and pressure switch PS3 through fixed contact 165 and movable contact 177 through the line 178 to ground. This circuit through coil 140 is associated with holding switch 138 in "closed" position. While a second and third circuit is made through contacts 147 and 146 through lines 179 and 180 to solenoid windings or coils 155 and 153 respectively, which are also respectively connected to switch 137 through contacts 143 and 142 and lines 167 and 154.

When the switch 137 is returned to opened position due to actuation of the pressure switch PS2 contact 149 is connected to power through movable contact 145 of the switch 137 and line 157. The circuit made by contact 149 through line 181 energizes the solenoid winding or coil 176 which is associated with valve 126 in FIG. 9 and connects the line 134 of the device 56 to pressure and line 132 of the device 56 to return. At the same time contacts 147 and 146 retain circuits through lines 179 and 180 through solenoid windings or coils 155 and 153 to ground respectively, thus maintaining the pressure connection to the line 130 of the device 57 in FIG. 9, the line 131 being connected of course simultaneously to return. While the circuit through solenoid winding 155 maintains the valve 121 in the isolating position.

When the draw arm has reached its open position, at the extension of its stroke, pressure will rapidly build up in pressure line 134 and the pressure switch PS3 will be operated thereby breaking the circuit through the holding coil 140 allowing the switch 138 to return to its normal open position halting the draw arm in the open position ready for reenergizing when the next tree is encountered.

The control valve 125 which controls the device 94 for opening and closing the holder means is controlled by the manually actuated switch 182. In the open position, the movable contact 185 engages the fixed contact 183 and energizes the winding 184 to open the holder arms whereas in the closed position the movable contact 185 engages the fixed contact 187 to energize the winding 186 to close the holders to block the throat of the channel 35. The movable contact 188 of the switch 182 serves the function in either of the open or closed position of engaging one of the contacts 191 or 189 or maintain the winding 155 energized, which controls the valve 121 of FIG. 9, it being noted that when the switch 137 or 138 is returned to open position by actuation of the pressure switch PS2 or PS3, the circuit to the winding 155 otherwise would have been broken.

The control system can of course be overridden at any time by manual actuation of the switches 137 and 138. For example, if closing of the draw arm should be required to be interrupted, the switches 137 and 138 are simply opened manually and the cycle will terminate. If the cycle has reached the stage in which the draw arm is opening, termination will require only that the switch 138 be opened since the switch 137 will already be opened. On the other hand, only part of the cycle may be initiated by closing only the switch 137 in which case the draw arm 50 will cycle to the point at which the draw arm is completely closed as aforesaid noted (unless the switch 137 is manually opened before that time). The cycle can then be completed manually by closing the switch 138. In the interest of rapid harvesting, however, one would normally allow the device automatically to execute a full cycle.

Since the harvesting and vehicle hydraulic systems are isolated during the shearing cycle, the overload relief valve 190 is provided in the hydraulic circuit of FIG. 9 which would be set to some maximum valve, say 3150 psi, to avoid damage to the harvesting attachment.

What is claimed is:

1. A tree harvesting assembly comprising, in combination:
  a frame adapted to be attached to a powered vehicle and having spaced, vertically extending leg portions, a generally U-shaped lower frame portion and a generally U-shaped upper frame portion, said frame portions being interconnected by said leg portions thereby defining a vertically elongate cradle for receiving the butt end of a standing tree, and fixed support plate means at the lower end of said cradle and extending forwardly from the closed inner side of said lower frame portion to terminate in a shear blade spaced inwardly from the open end of said lower frame portions;
  draw arm means pivotally mounted on said frame for reaching behind a tree, and including fluid-actuated means for driving said draw arm means to pull said frame forwardly to force said shear blade through the tree whereby the tree is completely sheared and crowded onto said support plate means; and
  holder means pivotally mounted on said frame for swinging behind a severed tree to retain it on said support plate means;
  said holder means being spring loaded to permit a tree to pass into said cradle whereby a plurality of trees may be accumulated on said support plate means;
  means for selectively swinging said holder means aside to allow accumulated trees to be discharged from the harvesting assembly; and
  said holder means including an arm pivoted on said frame adjacent the lower end of said cradle and another arm pivoted on said frame adjacent the upper end of said cradle, said means for selectively swinging including a vertical shaft connected to one of said pivoted arms.

2. A tree harvesting assembly as defined in claim 1 wherein said means for selectively swinging also includes a piston/cylinder assembly connecting said frame to said shaft to rotate the latter, there being a spring-loaded link between said shaft and each of said pivoted arms.

3. A tree harvesting assembly as defined in claim 2 including control valve means for cycling said fluid-actuated means whereby to operate said draw arm means to move rapidly to engage a tree against said shear blade, thereafter to move slowly while shearing a tree, and finally to return rapidly to inoperative position preparatory to receiving another tree into said channel.

4. A tree harvesting assembly as defined in claim 3 wherein said fluid-actuated means comprises a pair of piston/cylinder devices operating in parallel on said draw arm means, one of said piston/cylinder devices displacing a relatively small volume over its working stroke and the other of said piston/cylinder devices displacing a relatively large volume over its working stroke.

5. A tree harvesting assembly as defined in claim 4 wherein said control valve means selectively connects said piston/cylinder devices such that:
  (a) said smaller piston/cylinder device is actuated while the larger piston/cylinder device is idle to move said draw arm means rapidly to engage a tree against said shear blade,
  (b) both piston/cylinder devices are actuated to move said draw arm means slowly to shear the tree, and
  (c) said smaller piston/cylinder device is actuated to move said draw arm means toward said shear blade while said larger piston/cylinder device is actuated to move said draw arm means in the opposite direction resulting in rapidly returning said draw arm means to open position.

6. A tree harvesting assembly comprising a cradle-like frame adapted to receive a standing tree and to support it when severed, a shear blade fixed to said frame and engagable against a standing tree partially accepted in said cradle-like frame, draw arm means for engaging behind a partially accepted tree to force said frame forwardly and force said shear blade through the tree, spring-loaded holder means on said frame for swinging aside to accept a tree and springing closed behind a severed tree to retain it within said cradle-like frame, and a spring-loaded kicker bar on said draw arm means for kicking a tree behind said holder means when the tree is severed.

7. A tree harvesting machine as defined in claim 6 including means for selectively swinging said holder means aside to allow accumulated trees to be discharged from the harvesting assembly.

8. A tree harvesting assembly as defined in claim 7 wherein said draw arm means comprises a pivoted draw arm movable between an open position allowing a tree to be accepted by said frame and a closed position completely severing a tree.

9. A tree harvesting assembly comprising, in combination:
   a frame adapted to be attached to a powered vehicle and having spaced, vertically extending leg portions, a generally U-shaped lower frame portion and a generally U-shaped upper frame portion, said frame portions being interconnected by said leg portions thereby defining a vertically elongate cradle for receiving the butt end of a standing tree, and fixed support plate means at the lower end of said cradle and extending forwardly from the closed inner side of said lower frame portion to terminate in a shear blade spaced inwardly from the open end of said lower frame portions;
   draw arm means pivotally mounted on said frame for reaching behind a tree, and including fluid-actuated means for driving said draw arm means to pull said frame forwardly to force said shear blade through the tree whereby the tree is completely sheared and crowded onto said support plate means; and
   holder means pivotally mounted on said frame for swinging behind a severed tree to retain it on said support plate means; and
   a spring-loaded kicker bar in said draw arm means for kicking a tree behind said holder means when the tree is severed.

10. A tree harvesting assembly comprising in combination:
    a frame adapted to be attached to a powered vehicle and having spaced, vertically extending leg portions, a generally U-shaped lower frame portion and a generally U-shaped upper frame portion, said frame portions being interconnected by said leg portions thereby defining a vertically elongate cradle for receiving the lower end of a standing tree, and fixed support plate means at the lower end of said cradle and extending forwardly from the closed inner side of said lower frame portion to terminate in a shear blade spaced inwardly from the open end of said lower frame portions;
    draw arm means pivotally mounted on said frame for reaching behind a tree, and including fluid-actuated means for driving said draw arm means to pull said frame forwardly to force said shear blade through the tree whereby the tree is completely sheared and crowded into said support plate means;
    spring-loaded holder means pivotally mounted on said frame for automatically swinging aside to accept a tree and for automatically springing closed behind a tree as the frame is pulled forwardly during the severing operation whereby to retain the severed tree on said support plate means; and
    a spring-loaded kicker bar on said draw arm means for kicking a tree behind said holder means when the tree is severed.

11. A tree harvesting machine as defined in claim 10 including means for selectively swinging said holder means aside to allow accumulated trees to be discharged from the harvesting assembly.

12. In combination with a powered vehicle having hydraulic pump means and associated hydraulic system, a tree-cutting attachment attached to said vehicle and including a fixed shear blade and draw arm means for swinging behind a tree, said attachment including hydraulically-actuated means connected to said draw arm means to swing the same and thereby pull said attachment and said vehicle toward the tree and force said shear blade through the tree, and control valve means for selectively connecting said hydraulically-actuated means to said pump means, said control valve means including a mechanism for declutching said powered vehicle when said hydraulically-actuated means is so connected.

13. In the combination defined in claim 12 wherein said control valve means includes mechanism isolating said pump means from said hydraulic system when said hydraulically-actuated means is connected thereto.

14. In combination with a powered vehicle having hydraulic pump means for displacing hydraulic fluid at a predetermind maximum rate and including a hydraulic system connected to said pump means;
    a tree cutting attachment carried by said vehicle and including a hydraulically actuated tree shearing mechanism having a pair of parallel operating, double acting piston/cylinder devices for opening the tree shearing mechanism to accept a tree and for closing upon such tree to shear it, one of said piston/cylinder devices displacing a relatively small volume over its working stroke and the other of said piston/cylinder devices displacing a relatively large volume over its working stroke, and control valve means for selectively connecting said piston/cylinder devices such that:
    (a) said smaller piston/cylinder device is connected to said pump means while said larger piston/cylinder device is disconnected therefrom to close said tree shearing mechanism upon a tree at a low force, rapid rate of movement,
    (b) both of said piston/cylinder devices are connected in parallel to said pump means to shear the tree at a high force, slow rate of movement, and
    (c) said large piston/cylinder device is connected to said pump means to open said tree shearing mechanism while said smaller piston/cylinder device is connected to said pump means to close said tree shearing mechanism whereby to open said tree shearing mechanism at a rapid rate.

15. In the combination as defined in claim 14 wherein said control valve means includes a series of pressure-responsive devices sequentially connecting said piston/cylinder devices in conditions (a), (b) and (c).

16. In the combination as defined in claim 15 including a control valve selectively connecting one of said hydraulic system and said piston/cylinder devices to said pump means while isolating the other therefrom.

17. In the combination as defined in claim 14 including a control valve selectively connecting one of said hydraulic system and said piston/cylinder devices to said pump means while isolating the other therefrom.

18. In combination with a powered vehicle having hydraulic pump means for displacing hydraulic fluid at a pedetermined maximum rate and including vehicle-associated hydraulic mechanism connected to said pump means for operation up to a first predetermined maximum pressure, a tree cutting attachment carried by said vehicle and including hydraulically actuated tree shearing mechanism which is to be operated up to a second predetermined maximum pressure different from said first predetermined maximum pressure, and control valve means for selectively connecting one of said vehicle-associated hydraulically actuated mechanism and said hydraulically actuated tree shearing mechanism to said pump means while isolating the other therefrom.

19. In combination with a powered vehicle having hydraulic pump means for displacing hydraulic fluid at a predetermined maximum rate and including vehicle-associated hydraulic mechanism connected to said pump means for operation up to a first predetermined maximum pressure, a tree cutting attachment carried by said vehicle and including hydraulically actuated tree shearing mechanism which is to be operated up to a second predetermined maximum pressure greater than said first predetermined maximum pressure, and control valve means for selectively connecting one of said vehicle-associated hydraulically actuated mechanism and said hydraulically actuated tree shearing mechanism to said pump means while isolating the other therefrom.

20. A tree cutting attachment adapted to be carried by a powered vehicle and including a hydraulically actuated tree shearing mechanism adapted for actuation by hydraulic pump means and having a pair of parallel operating, double acting piston/cylinder devices for opening the tree shearing mechanism to accept a tree and for closing upon such tree to shear it, one of said piston/cylinder devices displacing a relatively small volume over its working stroke and the other of said piston/cylinder devices displacing a relatively large volume over its working stroke, and control valve means for selectively connecting said piston/cylinder devices such that:
   (a) said smaller piston/cylinder device is connected to the pump means while said larger piston/cylinder device is connected therefrom to close said tree shearing mechanism upon a tree at a low force, rapid rate of movement,
   (b) both of said piston/cylinder devices are connected in parallel to the pump means to shear the tree at a high force, slow rate of movement, and
   (c) said larger piston/cylinder device is connected to the pump means to open said tree shearing mechanism while said smaller piston/cylinder device is connected to the pump means to close said tree shearing mechanism whereby to open said tree shearing mechanism at a rapid rate.

21. A tree cutting attachment as defined in claim 20 including means responsive to pressures attained in said piston/cylinder devices for automatically sequencing through the conditions (a), (b) and (c).

22. A tree harvesting assembly comprising, in combination:

a frame adapted to be attached to a powered vehicle and defining a vertically elongate cradle having a closed inner side and an open forward side for receiving the butt end of a standing tree, and fixed support plate means at the lower end of said cradle and extending forwardly from the closed inner side of said cradle to terminate in a shear blade spaced inwardly from the forward side of said cradle;
draw arm means pivotally mounted on said frame for reaching behind a tree and including fluid-actuated means for driving said draw arm means to pull said frame forwardly to force said shear blade through the tree whereby the tree is completely sheared and crowded onto said support plate means; and
including control valve means for cycling said fluid-actuated means whereby to operate said draw arm means to move rapidly to engage a tree against said shear blade, thereafter to move slowly while shearing a tree, and finally to return rapidly to inoperative position preparatory to receiving another tree into said cradle.

23. A tree harvesting assembly as defined in claim 22 wherein said fluid-actuated means comprises a pair of double acting piston/cylinder devices operating in parallel on said draw arm means, one of said piston/cylinder devices displacing a relatively small volume over its working stroke and the other of said piston/cylinder devices displacing a relatively large volume over its working stroke.

24. A tree harvesting assembly as defined in claim 23 wherein said control valve means selectively connects said piston/cylinder devices such that:
   (a) said smaller piston/cylinder device is actuated while the larger piston/cylinder device is idle to move said draw arm means rapidly to engage a tree against said shear blade,
   (b) both piston/cylinder devices are actuated to move said draw arm means slowly to shear the trees, and
   (c) said smaller piston/cylinder device is actuated to move said draw arm means toward said shear blade while said larger piston/cylinder device is actuated to move said draw arm means in the opposite direction resulting in rapidly returning said draw arm means to open position.

25. A hydraulic system for tree shearing machines comprising, in combination:
a shearing mechanism;
a pair of hydraulic piston/cylinder devices connected mechanically in parallel to actuate the shearing mechanism, one of said devices displacing a relatively small volume and the other of said devices displacing a relatively large volume; and
control valve means connected to said devices for actuating said one device both alone and in conjunction with said other device.

26. A hydraulic system as defined in claim 25 wherein said control valve means also operates said devices in opposition to each other.

27. A hydraulic system as defined in claim 26 including pressure-responsive means for controlling the sequence in which said devices are actuated.

28. A hydraulic system as defined in claim 27 wherein said pressure-responsive devices are electrical switches.

* * * * *